US010279298B2

(12) United States Patent
Sudermann et al.

(10) Patent No.: US 10,279,298 B2
(45) Date of Patent: May 7, 2019

(54) PLATE-TYPE FILTER ELEMENT FOR GAS FILTRATION

(71) Applicant: MANN + HUMMEL GMBH, Ludwigsburg (DE)

(72) Inventors: Arthur Sudermann, Steinheim (DE); Marcel Hofmeister, Walheim (DE); Daniel Schmid, Sachsenheim (DE); Stefan Walz, Freiberg (DE); Matthias Krohlow, Herrenberg (DE); Thomas Sieber, Marklkofen (DE); Michael Kolmeder, Dingolfing (DE); Frank Pflueger, Sachsenheim (DE); Christian Thalmann, Speyer (DE); André Roesgen, Remshalden (DE); Robert Hasenfratz, Waiblingen (DE); Fabian Wagner, Moeglingen (DE)

(73) Assignee: MANN + HUMMEL GmbH, Ludwigsburg (DE)

( * ) Notice: Subject to any disclaimer, the term of this patent is extended or adjusted under 35 U.S.C. 154(b) by 73 days.

(21) Appl. No.: 15/456,721

(22) Filed: Mar. 13, 2017

(65) Prior Publication Data

US 2017/0182448 A1    Jun. 29, 2017

Related U.S. Application Data

(63) Continuation of application No. PCT/EP2015/070786, filed on Sep. 11, 2015.

(30) Foreign Application Priority Data

Sep. 12, 2014   (DE) .................... 10 2014 013 278

(51) Int. Cl.
*B01D 46/10* (2006.01)
*B01D 46/12* (2006.01)
(Continued)

(52) U.S. Cl.
CPC ......... *B01D 46/10* (2013.01); *B01D 46/0004* (2013.01); *B01D 46/12* (2013.01);
(Continued)

(58) Field of Classification Search
CPC ........ B01D 46/10; B01D 46/00; B01D 46/52; B60H 3/06; F02M 35/024; F02M 35/02
(Continued)

(56) References Cited

U.S. PATENT DOCUMENTS 8,277,527 B2 * 10/2012 Keller .................... F02B 27/00
                                                          123/198 E
8,287,624 B2 * 10/2012 Meisel ............... F24C 15/2035
                                                             95/1
(Continued)

FOREIGN PATENT DOCUMENTS

DE    102004026105 A1    12/2004
EP         1433947         6/2004
(Continued)

*Primary Examiner* — Duane Smith
*Assistant Examiner* — Minh Chau T Pham
(74) *Attorney, Agent, or Firm* — James Hasselbeck

(57) ABSTRACT

A plate-type filter element for gas filtration has a filter medium body with a circumferentially extending seal that contacts seal-tightly a first sealing surface of a filter housing extending in a filter element plane of the filter element. A sealing bracket is connected to the seal and contacts seal-tightly a second sealing surface of the filter housing extending at least partially outside of the filter element plane. A filter device has a filter housing with first and second sealing surfaces. A plate-type filter element is mountable exchangeably in the filter housing. The filter element has a filter medium body, a circumferentially extending seal, and a sealing bracket connected to the seal. The first sealing surface extends in the filter element plane; the second sealing surface extends partially outside of the filter element (Continued)

plane. The seal contacts seal-tightly the first sealing surface; the sealing bracket seal-tightly contacts the second sealing surface.

21 Claims, 9 Drawing Sheets

(51) Int. Cl.
*B01D 46/52* (2006.01)
*B01D 46/00* (2006.01)

(52) U.S. Cl.
CPC ........... *B01D 46/52* (2013.01); *B01D 46/521* (2013.01); *B01D 2271/022* (2013.01); *B01D 2275/206* (2013.01)

(58) Field of Classification Search
USPC ...... 55/498, 501, 502, 490, 495, 385.3, 529; 123/198 E
See application file for complete search history.

(56) References Cited

U.S. PATENT DOCUMENTS

| | | | |
|---|---|---|---|
| 8,409,312 B2* | 4/2013 | Gorg | B01D 46/0063 123/198 E |
| 9,895,640 B2* | 2/2018 | Sudermann | B01D 46/002 |
| 2008/0083200 A1* | 4/2008 | Gruber | B62J 37/00 55/385.3 |
| 2014/0260143 A1* | 9/2014 | Kaiser | B01D 46/10 55/501 |
| 2014/0318090 A1* | 10/2014 | Rieger | B01D 46/0001 55/502 |
| 2015/0013293 A1* | 1/2015 | Wagner | B01D 46/10 55/502 |
| 2015/0135665 A1* | 5/2015 | Bayerlein | B01D 46/0006 55/482 |
| 2016/0160816 A1* | 6/2016 | Venkatraman | F02M 35/0209 55/502 |

FOREIGN PATENT DOCUMENTS

| | | |
|---|---|---|
| EP | 1433947 A2 | 6/2004 |
| WO | 2009149706 A2 | 12/2009 |

* cited by examiner

PLATE-TYPE FILTER ELEMENT FOR GAS FILTRATION

CROSS-REFERENCE TO RELATED APPLICATIONS

This application is a continuation application of international application No. PCT/EP2015/070786 having an international filing date of 11 Sep. 2015 and designating the United States, the international application claiming a priority date of 12 Sep. 2014, based on prior filed German patent application No. 10 2014 013 278.1, the entire contents of the aforesaid international application and the aforesaid German patent application being incorporated herein by reference.

BACKGROUND OF THE INVENTION

The invention concerns a plate-type filter element for gas filtration, in particular for air filtration, in particular for filtration of the intake air of an internal combustion engine, comprising a filter medium body and a seal. circumferentially extending about the filter medium body for seal-tight contact on a filter housing-associated first sealing surface extending in a filter element plane.

Known are, for example, from EP 2 223 727 A1, filter devices for filtration of gaseous fluids with a plate-type filter element that is received in a filter housing and flowed through, transverse to the filter element plane, by the gas to be purified. The discharge of the purified gas is realized by an outflow socket that is introduced into the filter housing orthogonally to the filter element plane.

The filter element is framed by a frame that is a support of a circumferentially extending sealing element. The frame with the sealing element is located on the clean side of the filter element and separates the clean side from the raw side.

SUMMARY OF THE INVENTION

It is the object of the invention to provide with simple constructive measures a plate-type filter element for gas filtration exhibiting high efficiency.

This object is solved according to the invention in that to the circumferentially extending seal a sealing bracket is connected which is embodied for seal-tight contact on a second housing-associated sealing surface which is extending at least partially outside of the filter element plane.

The plate-type filter element according to the invention is used for gas filtration, for example, for air filtration in an air filter by means of which the combustion air is purified that is to be supplied to the internal combustion engine of a vehicle. Conceivable is also a use for filtration of breathing air which is supplied to the passenger compartment or a cabin.

The flat plate-type filter element can be inserted into a filter housing of a filter device and is flowed through orthogonally to the filter plane by the gas to be purified so that a side face of the filter element forms the raw side and the opposite side forms the clean side. The discharge of the purified gas from the clean side of the filter element is realized preferably by means of an outflow socket provided in the filter housing.

The plate-type filter element comprises a filter medium body by which the gas filtration takes place and a seal circumferentially extending about the filter medium body and supported on a first filter housing-associated sealing surface which is extending in a filter element plane. A sealing bracket is connected to the circumferentially extending seal on the filter medium body and is formed for seal-tight contact on a second sealing surface also provided on the filter housing, wherein this second sealing surface is extending at least partially outside of the filter element plane of the plate-type filter element. The filter element plane extends in this context parallel to the inflow side or outflow side of the plate-type filter element; it is located preferably immediately on the inflow side or the outflow side where also the circumferentially extending seal is arranged.

This configuration makes it possible to have the sealing bracket contact the outer wall surface of a housing-associated component, for example, an outflow socket, wherein the sealing bracket at least partially engages about the housing-associated component. The seal on the filter medium body of the filter element and the sealing bracket form a constructive unit with which an effective separation of the raw side from the clean side of the filter element can be ensured so that leakage flows are avoided and the efficiency for gas filtration is improved. At the same time, a compact configuration can be realized in which the outflow socket is arranged adjacent to the clean side of the filter element and the sealing bracket is held by the seal on the filter element.

As a result of the embodiment with the first sealing surface in the filter element plane and the second sealing surface at least partially outside of the filter element plane, a contact on a three-dimensional wall surface of the housing-associated component on which the sealing bracket is resting can be realized. It is thus possible to effect the sealing action, for example, relative to a rounded housing-associated component such as the outflow socket. The second housing-associated sealing surface which is at least partially outside of the filter element plane can extend partially or completely, as necessary, in a curved shape, for example, can be embodied to be circular or part-circular. At the same time, contact on the first sealing surface is possible which is extending at least partially or completely, as necessary in a plane parallel to the filter element plane.

According to a further advantageous embodiment, the sealing bracket is connected with its two opposite ends to the circumferentially extending seal on the filter element. However, it is also possible to connect the sealing bracket with a section located between its ends to the circumferentially extending seal.

According to an expedient embodiment, the sealing bracket is embodied to be shape-stable; it retains thus its bracket shape even without contacting a sealing surface. However, it is also possible that the sealing bracket assumes its bracket shape only upon contacting the sealing surface.

The filter element with the filter medium body is of a plate-type configuration wherein the filter medium body can be embodied to be U-shaped, as necessary. The sealing bracket and a section of the circumferentially extending seal can be designed in such a way that they seal-tightly enclose together a fluid flow path that extends laterally past the filter medium body, wherein the filter flow path is advantageously formed by a flow socket. In case of a U-shaped configuration of the filter medium body, the enclosed fluid flow path is expediently positioned between the legs of the U-shape.

With the filter element inserted, at least a section of the sealing bracket serves advantageously for sealing the housing interior relative to the housing exterior.

The seal is located preferably on the clean side of the filter element. In principle, an arrangement on the raw side of the filter element is however possible also. The seal extends preferably along the outer contour of the plate-type filter element. The sealing bracket extends advantageously from the outer circumferentially extending seal outwardly and is located expediently in the undeformed state approximately in the same plane in which the seal is arranged, or parallel displaced to the plane. In the installed situation, the sealing bracket can project on the other hand past the plane of the seal.

Possible are one-piece embodiments of seal and sealing bracket as well as separate configurations in which however the sealing bracket is connected to the seal. In case of a one-piece embodiment, for example, the sealing material of the seal is cast onto the filter element wherein also the sealing bracket is cast in the same processing step. The sealing material is elastically deformable so that accordingly the sealing bracket, which in the undeformed state can lie at least approximately in the plane of the seal, is also deformable. For the sealing bracket to contact the outflow socket, the sealing bracket can be three-dimensionally deformed to such an extent that a section of the sealing bracket is resting flow-tightly, for example, on the outer wall of the outflow socket. The sealing bracket can thus be produced as a flat sealing component and as a result of its deformability can be brought into a three-dimensional installed situation.

Seal and sealing bracket, as necessary, can be comprised only of sealing material, for example, of a PUR foam. Possible is however also an embodiment with a support and a sealing material for the seal and/or the sealing bracket that is applied to the support. The support of the seal forms in this context a frame which is resting on the filter element and is connected to it, for example, by means of an adhesive or by fusing. The sealing material is applied, for example, by injection molding, to the frame.

In a corresponding way, the sealing bracket is also provided with a support and a sealing material applied to the support. The support of the sealing bracket and of the seal is comprised preferably of plastic material, respectively.

In the embodiment of seal and sealing bracket with a support and an applied sealing material, a one-piece as well as a separate configuration are conceivable. In the one-piece embodiment, the supports of seal and sealing bracket are embodied as a common component which is provided with a sealing material. In case of a separate embodiment, the support or frame of the seal and the support of the sealing bracket are embodied as separate components, wherein the support of the sealing bracket is then connected to the frame of the seal. After connecting, as necessary even prior to connecting, the sealing material is applied onto the support. The support of the sealing bracket can be three-dimensionally deformed and matched to the outer contour of the component, such as the outflow socket.

According to a further expedient embodiment, the filter element comprises a clean-side gas collecting chamber into which the gas is flowing and collected after flowing through the filter element. From the gas collecting chamber, the purified gas can be discharged subsequently through the outflow socket that advantageously adjoins immediately the gas collecting chamber. The gas collecting chamber is preferably provided in the filter element and is embodied to be open at the rim and is located within an envelope which is delimiting the outer contour of the filter element. The sealing bracket bridges or spans the gas collecting chamber which is delimited by the filter element on at least two of its sides.

For example, the filter element can be embodied in a U-shape wherein the gas collecting chamber is delimited on three of its sides between the lateral legs of the U-shape and a connecting central section of the filter element. Possible is also an H-shaped configuration with two oppositely arranged gas collecting chambers which are delimited by lateral legs of the filter element and are separated by a central section of the filter element. In both embodiments, the gas collecting chamber is located inside the outer contour of the filter element wherein each gas collecting chamber has correlated therewith an outflow socket for discharging the purified gas. The sealing bracket spans the outflow socket preferably along the outer contour of the filter element. The longitudinal axis of the outflow socket extends advantageously in the filter plane or parallel thereto; it is furthermore expedient that the outflow socket is facing the filter element. The gas collecting chamber provides for a flow calming action of the gas on the clean side and avoids or reduces turbulences in the flow during discharge by means of the outflow socket.

The filter element comprises expediently a rectangular outer contour; also, the gas collecting chamber is preferably of a rectangular shape. However, deviating geometries for the filter element as well as for the gas collecting chamber are possible also, for example, a triangular gas collecting chamber.

According to a further expedient embodiment, the basic shape of the gas collecting chamber corresponds to a cutout that is cut out of the filter element. The filter element is in particular cut out at the rim side wherein the cutout forms the gas collecting chamber. For example, in a block-shaped filter medium body of the filter element where the filtration is taking place, an area adjoining the rim can be cut out, for example, in a rectangular shape, a triangular shape, or semi-circular shape, which forms the gas collecting chamber. The gas collecting chamber therefore adjoins immediately the rim area of the cut-out filter medium body.

According to a further expedient embodiment, the filter element is comprised of at least two individual filters which, for example, are embodied as filter bellows with a zigzag-folded filter medium body. The individual filters connected to each other are embodied to be flat, respectively; adjoining individual filters are positioned parallel to each other. The individual filters can be different with respect to their thickness, length, and/or width or, as necessary, can also be of identical configuration. It can be expedient that the clean side of all individual filters which form the filter element is positioned in a common plane.

When using as filter medium bodies one or more filter bellows, the latter can have an orientation of the filter folds orthogonal to the rim side of the filter element where the gas collecting chamber that is open at the rim is located. However, an embodiment is conceivable also in which the filter folds of the filter bellows are parallel to the rim side of the filter element with the gas collecting chamber that is open at the rim. Moreover, it is possible in case of several filter bellows that each form an individual filter, to have either the same orientation of the filter folds of all filter bellows or a different orientation of the filter folds.

According to a further expedient embodiment, on the filter element, in particular on the filter medium body of the filter element, a circumferentially extending plastic frame is arranged, for example, by injection molding. The plastic frame is connected fixedly to the filter medium body and can be a support of the circumferentially extending sealing element. The plastic frame is located on the rim side or exterior side of the filter medium body and follows thus the outer contour of the filter medium body.

BRIEF DESCRIPTION OF THE DRAWINGS

Further advantages and expedient embodiments can be taken from the further claims, the figure description, and the drawings.

In the Figures, same components are provided with same reference characters.

DESCRIPTION OF PREFERRED EMBODIMENTS

Figure 1:
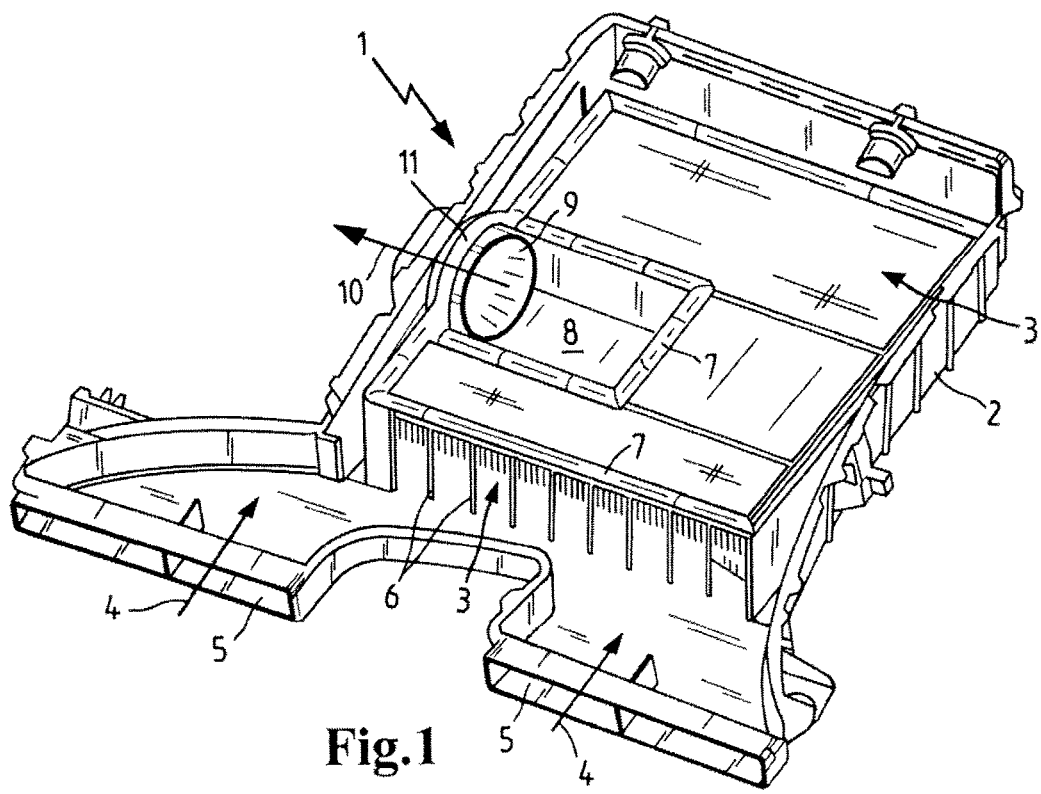
FIG. 1 shows a filter device embodied as an air filter, comprising a plate-type filter element in U-shape that delimits a clean-side gas collecting chamber by means of which the purified gas can be supplied to an outflow socket for discharging from the filter housing.

In FIG. 1, a filter device 1 for gas filtration is illustrated which is usable as an air filter for filtration of combustion air to be supplied to the internal combustion engine of a vehicle. The filter device 1 comprises, in a filter housing 2, a U-shaped filter element 3 which is embodied to be flat or plate-shaped, wherein in FIG. 1 the side of the filter element 3 at the bottom is the raw side and the side at the top is the clean side. The inflow is realized according to arrows 4 through inlets 5 of the filter housing 2 wherein the raw side of the filter element 3 is separated by support ribs 6 of the filter housing 2 from the inlets 5. The support ribs 6 have a supporting function for a circumferentially extending seal 7 on the top side or clean side of the filter element 3. The seal 7 extends along the U-shaped outer contour on the top side of the filter element 3. The support ribs 6 allow for inflow of the raw air to the raw side at the bottom of the filter element 3; as necessary, they can have also a flow-guiding function in addition to the support function.

In the U-shaped area of the filter element 3, a gas collecting chamber 8 for the gas to be purified is formed which is flowing from the clean side at the top of the filter element 3 into the gas collecting chamber 8. The gas collecting chamber 8 is positioned inside the rectangular outer contour or envelope of the filter element 3 and is delimited on three sides by the filter element 3. The gas collecting chamber 8 is open at the rim side; in the area of its open side there is a housing-associated outflow socket 9 by means of which the purified gas collected in the gas collecting chamber 8 is discharged according to arrow 10 from the filter housing. The arrow 10 marks at the same time the longitudinal axis of the outflow socket 9. The outflow socket 9 comprises at its side which is facing the gas collecting chamber 8 a tulip-shaped or trumpet-shaped widened portion which ensures an improved discharge of the gas from the gas collecting chamber 8.

In addition to collecting the purified gas which is exiting at the top side of the filter element 3, the gas collecting chamber 8 also has a flow-calming function. In this way, a laminar outflow of the purified gas according to arrow 10 through the outflow socket 9 is enhanced.

On the top side or clean side of the filter element 3, a sealing bracket 11 is formed as one piece together with the seal 7, extending along the outer contour on the filter element 3, and bridges the gas collecting chamber 8 and is resting on the wall surface of the outflow socket 9.

Figure 2:
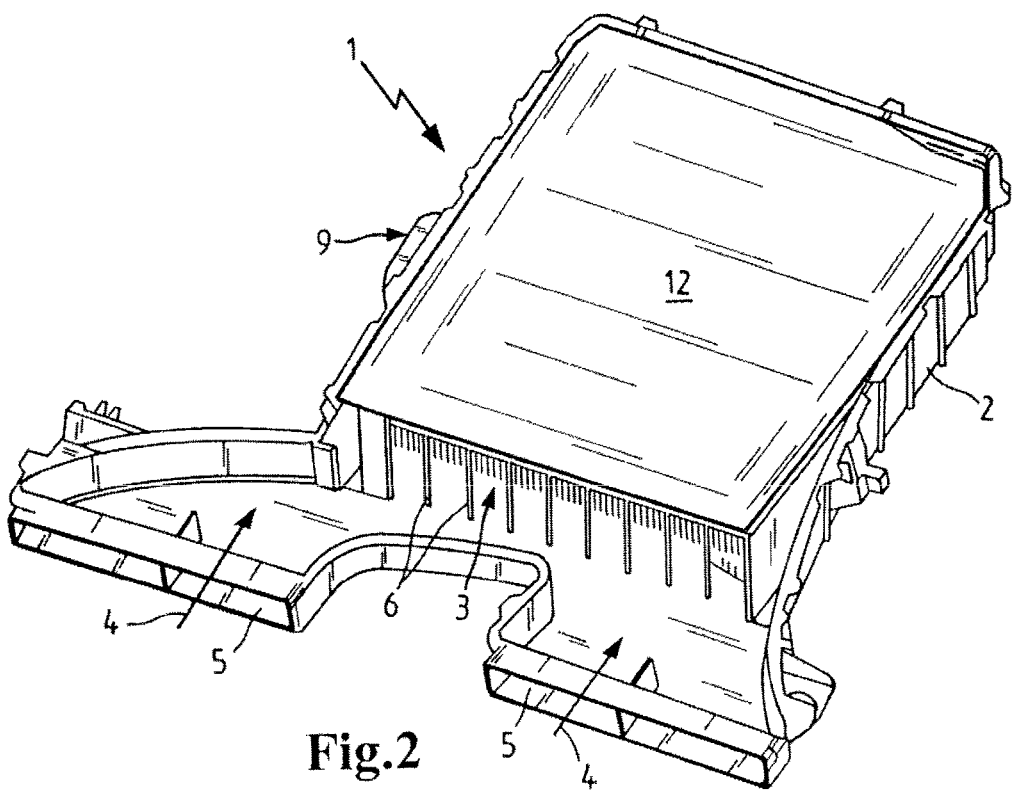
FIG. 2 shows the filter device according to FIG. 1 with attached cover element on the filter element.
Figure 3:
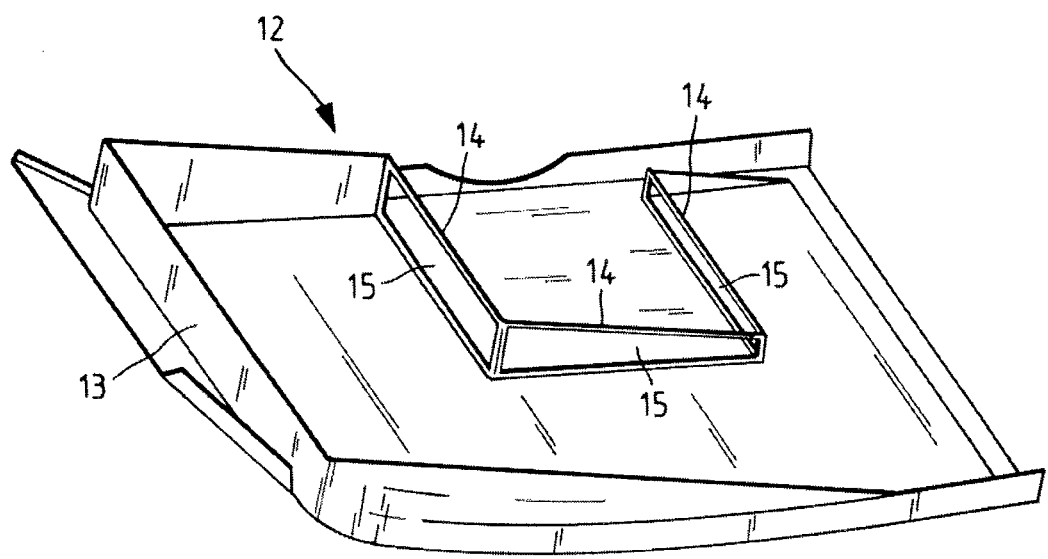
FIG. 3 shows the cover element in a view from below.

In FIG. 2, the filter device 1 is illustrated with a plastic cover element 12 which is placed onto the filter element 3. In FIG. 3, the cover element 12 is illustrated in a view from below from which it can be taken that on the cover element 12 a circumferential sealing frame 13 is integrally formed which, in mounted position, is resting on the circumferentially extending seal 7 (FIG. 1) and delimits a clean space on the clean side at the top of the filter element 3 in outward direction. On the inner side of the cover element 12, as can be seen moreover in FIG. 3, there is also a support frame 14 integrally formed which corresponds to the rectangular contour of the gas collecting chamber 8 and is provided with openings 15 by means of which the purified gas can flow from the clean side of the filter element 3 inwardly in the direction of the gas collecting chamber 8.

Figure 4:
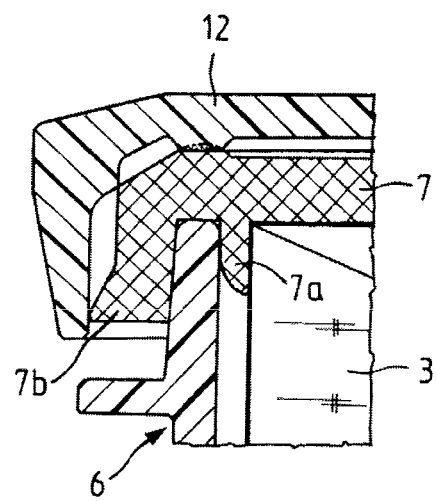
FIG. 4 shows a section through the rim area of the filter element.

FIG. 4 shows a section illustration through the rim area of the filter element 3 with circumferentially extending seal 7 that acts to seal in radial direction and is supported on the filter housing 2, comprised of plastic material, by the support ribs 6 or a transverse beam supported by the support ribs 6. Between the support ribs 6 or the transverse beam and the filter element 3 there is a sealing lip 7a. On the exterior side of the support ribs 6 or the transverse beam, a further folded-over sealing lip 7b is provided. The sealing lip 7b as well as the top sections of the seal 7 are engaged across by the cover element 12.

Figure 5:
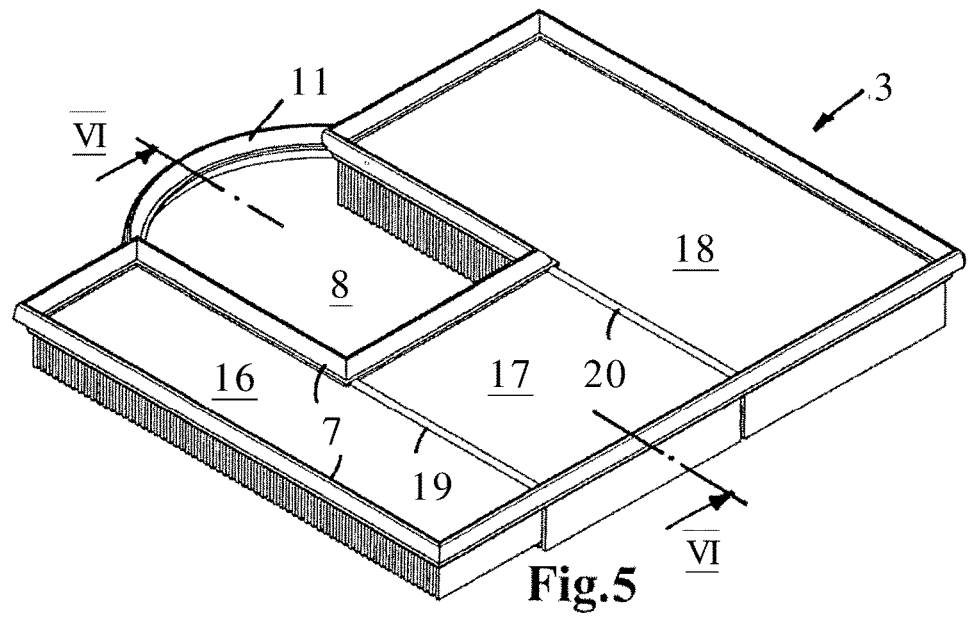
FIG. 5 shows the filter element in perspective illustration.
Figure 6:
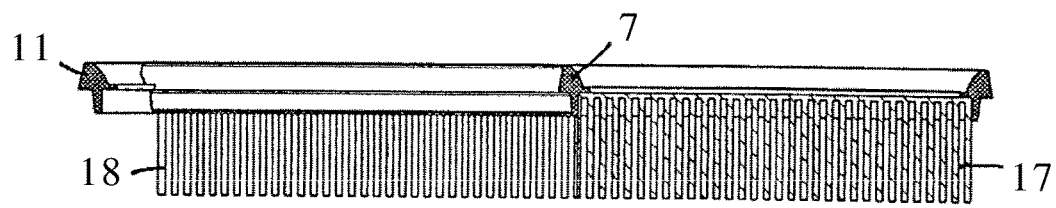
FIG. 6 shows a section according to section line VI-VI of FIG. 5 through the filter element.

In FIGS. 5 and 6, the filter element 3 is shown in individual illustration. The U-shaped filter element 3 is comprised of three separately embodied individual filters that are embodied as filter bellows 16, 17, 18 which each comprise a folded filter medium and are formed flat or plate-shaped. The clean side at the top of all filter bellows 16, 17, and 18 is positioned in a common plane while the raw side at the bottom, due to different heights of the filter bellows, is positioned at different levels. The two outwardly positioned filter bellows 16 and 18 form the legs of the U-shape; the central intermediately positioned filter bellows 17 connects the two outwardly positioned filter bellows 16 and 18. The filter bellows 16, 17, and 18 delimit the rectangular gas collecting chamber 8 on three different sides. Also, the filter element 3 as a whole has a rectangular shape wherein the gas collecting chamber 8 is located within the envelope or outer contour of the rectangular shape of the filter element 3 and is open at the rim. The first outwardly positioned filter bellows 16 has a reduced height in comparison to the two further filter bellows 17 and 18 that have the same height. The length of the gas collecting chamber 8, viewed along the longitudinal extension of the lateral legs formed by the filter bellows 16 and 18, corresponds approximately to half of the total length of the filter element 3.

At its open side, the gas collecting chamber 8 in the area of the outer contour of the filter element is spanned by a sealing bracket 11 which in the mounted state (FIG. 7) is resting on the outer wall surface of the outflow socket 9. In the embodiment according to FIGS. 5 to 7, the sealing bracket 11 is formed as one piece together with the seal 7 on the clean side of the filter element 3. The seal 7 and the sealing bracket 11 are cast onto the filter element 3.

Figure 7:
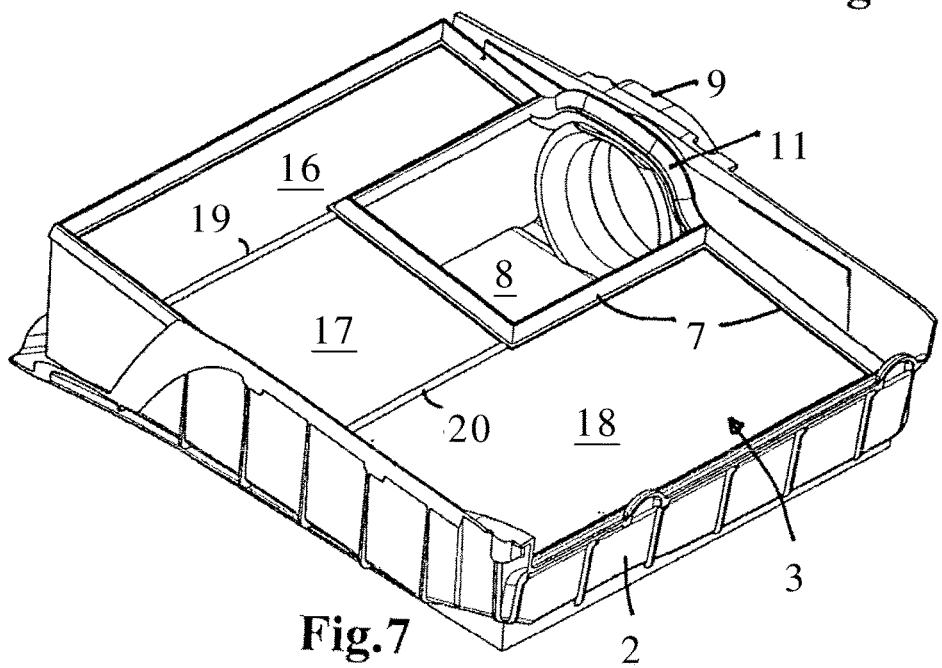
FIG. 7 shows in perspective illustration the filter element inserted into the filter housing.

In the undeformed state (FIGS. 5, 6), the sealing bracket 11 is positioned in the same plane as the circumferentially extending seal 7 and is convexly curved in outward direction so that the actual length of the sealing bracket 11 is greater than the width of the gas collecting chamber 8 to be bridged. This makes it possible, as illustrated in FIG. 7, to fold the sealing bracket 11 in upward direction by 90° and to deform it three-dimensionally so that the sealing bracket 11 comes to lie against the outer wall of the outflow socket 9 on the filter housing 2.

Adjoining filter bellows 16, 17 are joined together by a sealing strip 19. Similarly, adjoining filter bellows 17, 18 are joined together by a sealing strip 20. For the rest, the filter bellows 16, 17, 18 are resting immediately against each other. Also, the circumferentially extending seal 7 holds the filter bellows 16 to 18 together.

The extension in transverse direction, i.e., transverse to the longitudinal extension along the outwardly positioned filter bellows 16 and 18 that form the legs, can be of different size for the filter bellows. In the embodiment, the first outwardly positioned filter bellows 16 has a smaller transverse extension than the two further filter bellows 17 and 18 which are approximately of the same size in transverse direction.

Figure 8:
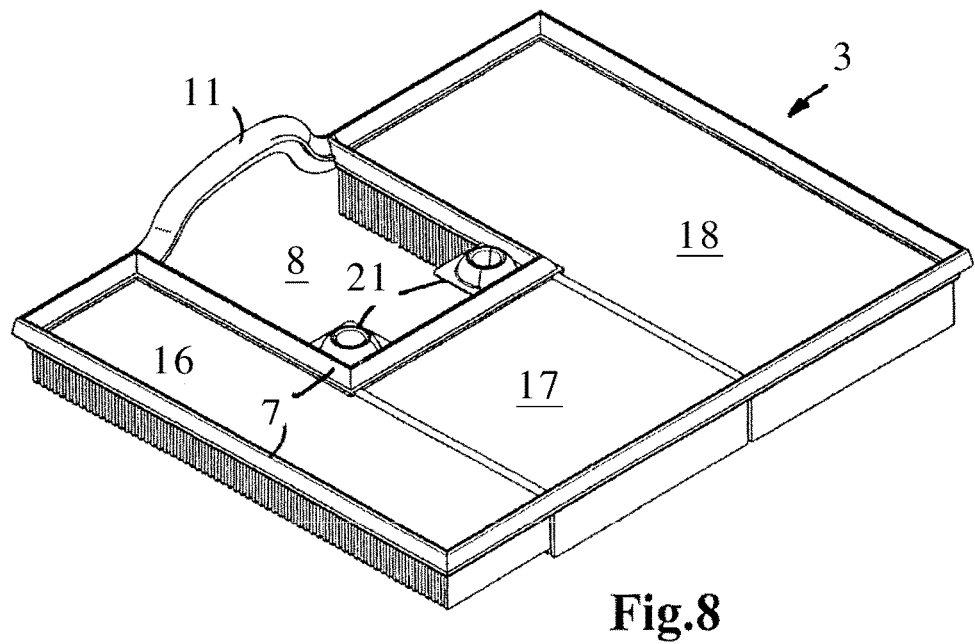
FIG. 8 shows the filter element in an embodiment variant with sealing eyes in the gas collecting chamber, wherein the sealing eyes are connected to a circumferentially extending sealing element on the filter element.
Figure 9:
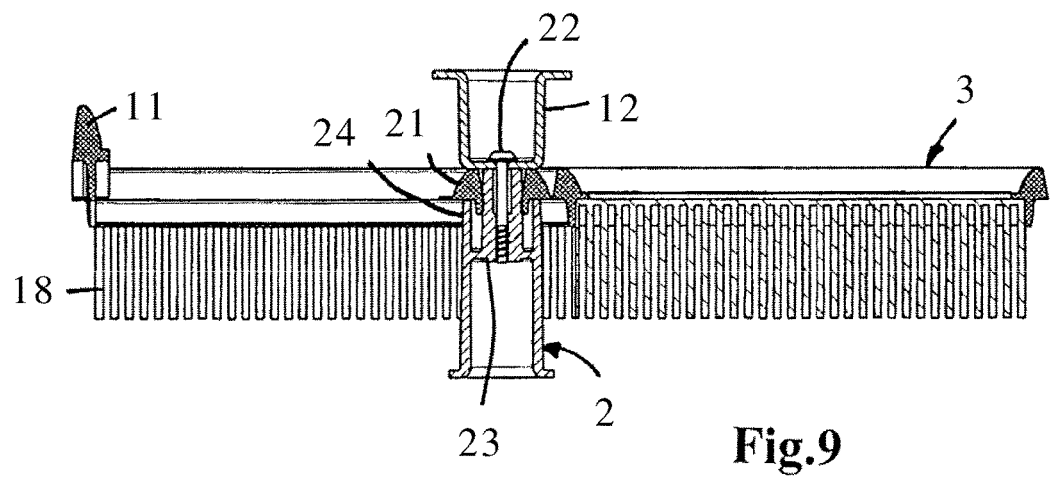
FIG. 9 shows a section through the filter element in the area of a sealing eye through which a tensioning bolt for connecting the filter housing to the cover element is extending.

In FIGS. 8 and 9, an embodiment variant is illustrated in which the filter element 3 is in principle of the same construction as in FIG. 5. In addition, sealing eyes 21 are however integrally formed on the circumferentially extending seal 7 and serve for receiving a tensioning bolt by means of which, in the area of the sealing eyes 21, the cover element 12 is to be connected to the filter housing 2 by screwing. The sealing eyes 21 are located in the gas collecting chamber 8 on the side which is facing the central filter bellows 17 and are preferably embodied as one piece together with the seal 7. The tensioning bolt 22 is inserted from above into a depression in the cover element 12 and screwed into a support sleeve 23 of the filter housing 2 which is projecting upwardly from the filter housing 2 arranged at the bottom and which is located in the corner area of the gas collecting chamber 8. The sealing eye 21 engages around the support sleeve 23 and is supported on an annular shoulder 24 of the support sleeve 23. The top end face of the sealing eye 21 is loaded axially by the depression in the cover element on which also the head of the tensioning bolt 22 is resting. By screwing the tensioning bolt 22 into the support sleeve 23, a pressure is axially applied onto the sealing eye 21 so that the clean chamber at the top is separated flow-tightly from the raw side positioned at the bottom.

Figure 10:
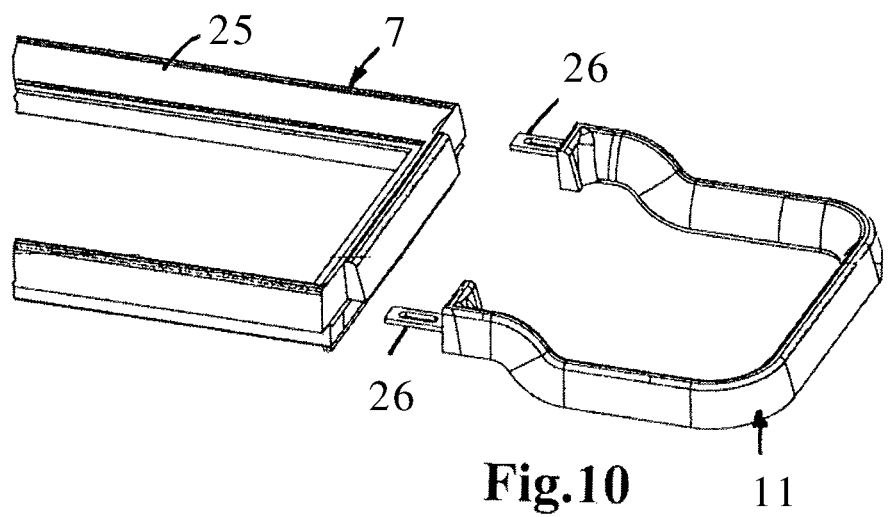
FIG. 10 shows an embodiment variant with a sealing bracket on a frame which can be placed onto a filter bellows, wherein the sealing bracket comprises a separate plastic component part to which a sealing foam is to be connected by injection molding.
Figure 11:
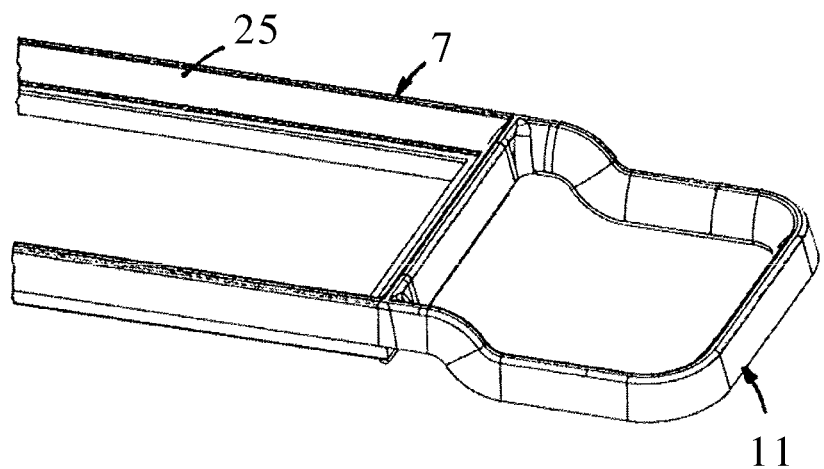
FIG. 11 shows the embodiment variant of FIG. 10 with the sealing bracket attached to the frame.

In FIGS. 10 and 11, an embodiment variant for producing a circumferentially extending seal 7 is illustrated. In contrast to the preceding embodiments, the seal 7 is not cast onto the filter element but, in accordance with FIGS. 10 and 11, a support 25 of plastic material that forms a frame is connected with the filter element or the filter bellows, in particular adhesively. The frame 25 can subsequently be provided with a sealing material, for example, with a metered-on PUR foam.

The sealing bracket 11 which is resting on the outflow socket is embodied as a separate component and is comprised in analogy to the seal 7 of a support of plastic material that is U-shaped and comprises at both its end faces a connecting tab 26, respectively, for connection with the frame 25. After connecting the sealing bracket 11 to the frame 25 (FIG. 11), the frame 25 and the plastic support of the sealing bracket 11 can be provided with sealing material in a common step.

The sealing bracket 11 comprises a three-dimensionally deformed shape and is in particular matched to the outer contour of the outflow socket.

Figure 12:
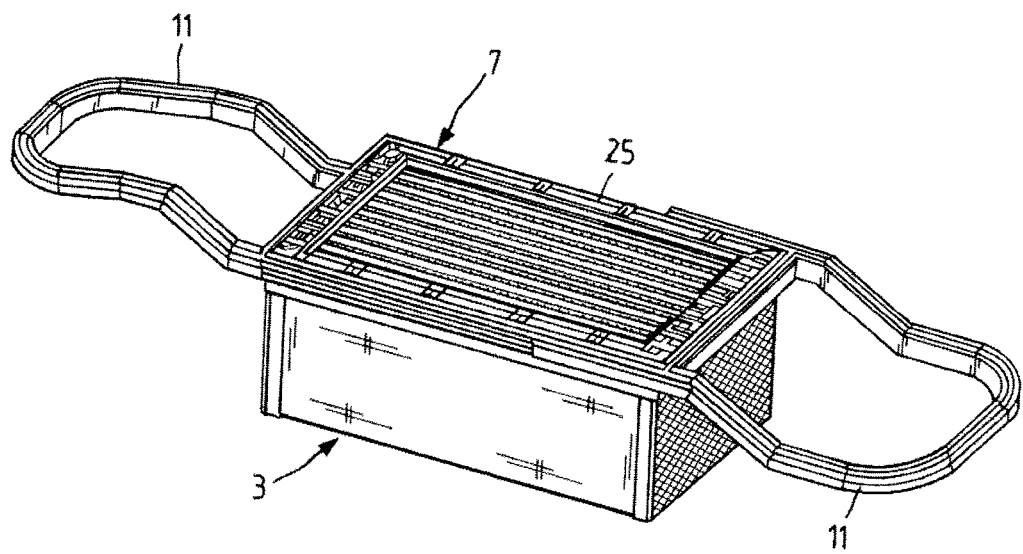
FIG. 12 shows in an embodiment variant two sealing brackets on opposed sides of a filter bellows, wherein the sealing brackets are formed as one piece together with a frame element on the filter bellows and are provided with sealing material.

In the embodiment according to FIG. 12, the sealing bracket 11 is formed as one piece together with the seal 7. As in the embodiment according to FIGS. 10 and 11, the seal 7 is comprised of a frame 25 of plastic material which is connected to the filter element 3, for example, adhesively. The plastic support of the sealing bracket 11 is embodied as one piece together with the frame 25 and is three-dimensionally deformed and, according to the left half of FIG. 12, is angled relative to the plane of the frame 25 in upward direction and, according to the right half of FIG. 12, is angled in downward direction. The frame 25 and the plastic support of the sealing bracket 11 are provided in a common step with sealing material that can be applied, for example, by injection molding.

Figure 13:
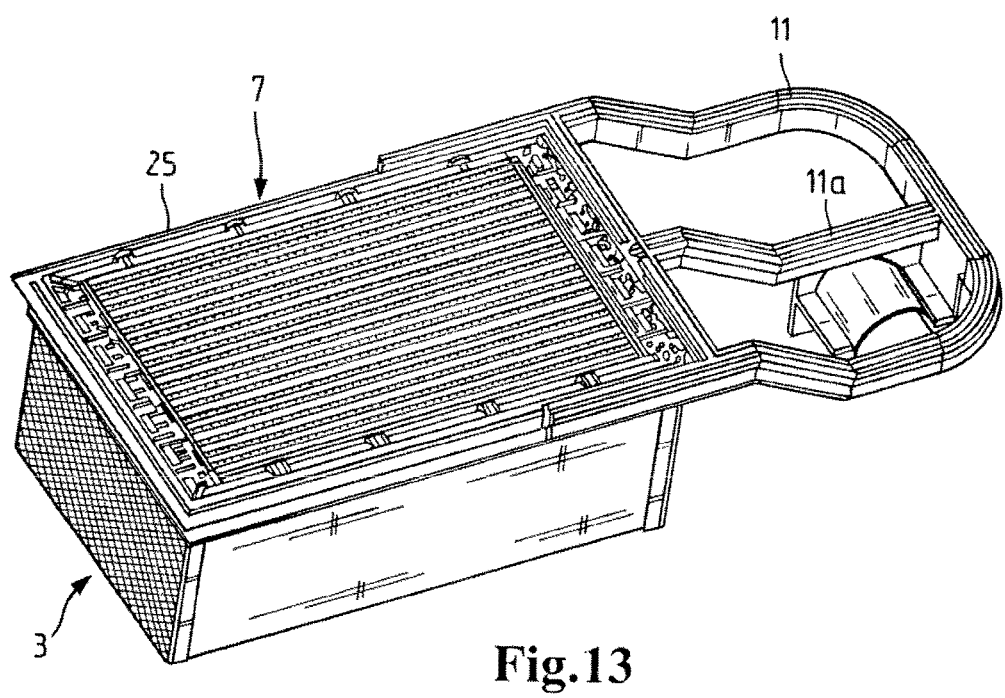
FIG. 13 shows an embodiment similar to FIG. 12 but with a deviating geometry of the sealing bracket.

In the embodiment according to FIG. 13, as in FIG. 11, the seal 7 is provided with a frame 25 and the plastic support of the sealing bracket 11 is formed together with it as one piece. Frame 25 and plastic support of the sealing bracket 1 together can be provided with sealing material. In the sealing bracket 11, in contrast to FIG. 12, an additional stay 11a can be integrally formed which is centrally extending between the U-shaped sealing bracket 11 and improves the stability. The additional stay 11 a may also support further functional plastic parts. The stay 11 a can also be provided with sealing material.

Figure 14:
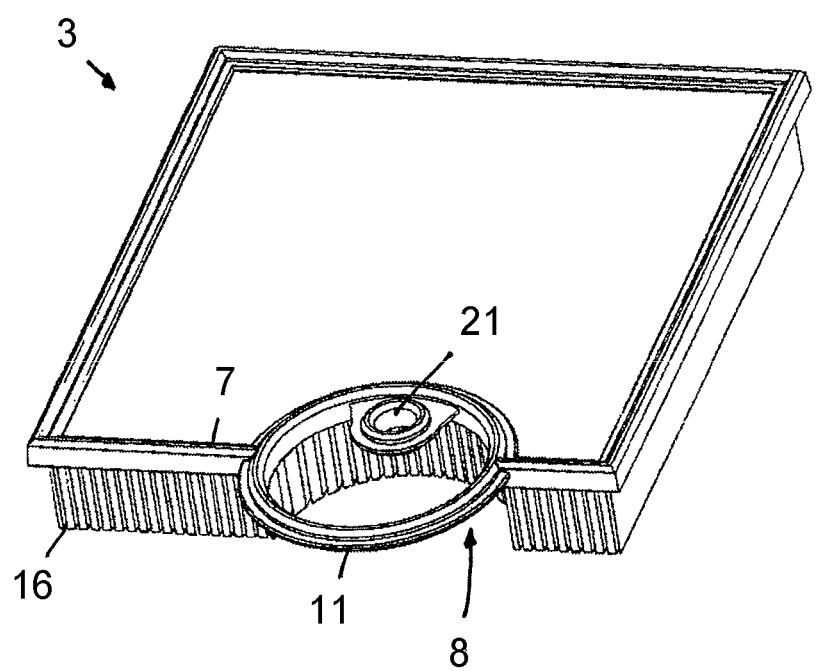
FIG. 14 shows a filter element in an embodiment variant with a part-circular gas collecting chamber in the rim area of the filter element with an annular sealing element at the gas collecting chamber on which a sealing eye is integrally formed.

In FIG. 14, a further embodiment of a filter element 3 with a filter bellows 16 embodied as a folded filter is illustrated. The filter bellows 16 is cut out at the rim area wherein the cutout forms the gas collecting chamber 8 which has a part-circular basic shape in FIG. 14.

On the outer contour of the filter bellows 16, the seal 7 is extending circumferentially and also follows the contour in the area of the cutout that forms the gas collecting chamber 8. In the area of the gas collecting chamber 8, the sealing element has an annular shape wherein the ring area projecting past the rim side of the filter element forms the sealing bracket 11 which, in the installed state of the filter element, is resting on the wall surface of the outflow socket. As necessary, on the filter bellows 16 a plastic frame is applied by injection molding which is the support of the seal 7 and can also be a component of the sealing bracket 11.

In the inwardly positioned area of the annular sealing element, a sealing eye 21 is integrally formed which, in accordance with the embodiment of FIGS. 8 and 9, serves for receiving a tensioning bolt by means of which, in the area of the sealing eye 21, a cover element is to be connected to the filter housing by screwing.

Figure 15:
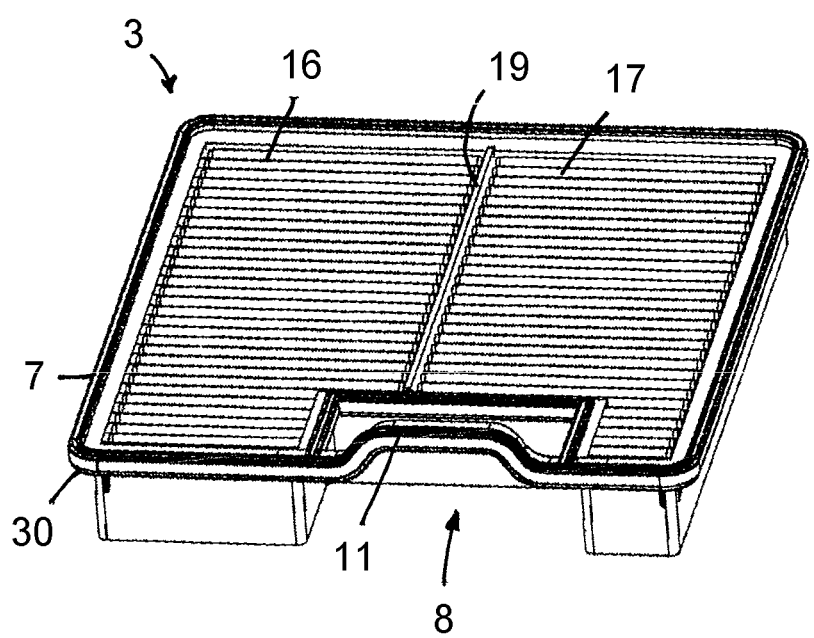
FIG. 15 shows a further filter element with a rectangular gas collecting chamber and two individual filters which are each formed as filter bellows with filter folds.

In the embodiment according to FIG. 15, the filter element 3 has two filter bellows 16 and 17 that each are of rectangular shape and of the same size. The filter folds of the two filter bellows 16 and 17 extend parallel; they are positioned also parallel to the rim side into which the gas collecting chamber 8 is introduced by cutting. The two filter bellows 16 and 17 are connected by the sealing strip 19.

The gas collecting chamber 8 comprises a rectangular basic shape; it is asymmetrically introduced into the filter element 3 in such a way that the section forming the gas collecting chamber concerns mostly the filter bellows 17 and less so the filter bellows 16. In this way, the gas collecting chamber 8 is arranged with lateral displacement relative to a longitudinal center plane in which also the sealing strip 19 is positioned.

On the filter element 3, a circumferentially extending plastic frame 30 is applied by injection molding and follows the outer contour of the filter element 3 with the two filter bellows 16 and 17 and is the support of the seal 7. The plastic frame 30 also follows the cutout that forms the gas collecting chamber 8. Also, the gas collecting chamber 8 is bridged by a bracket in the area of the cutout along the outer contour; the sealing element that is also resting on the plastic frame 30 in this area forms together with the plastic frame 30 the sealing bracket 11. The plastic frame 30 is deformed in the bridged section in a bracket shape wherein the bracket is positioned above the plane of the plate-type sealing bellows 16 and 17.

Figure 16:
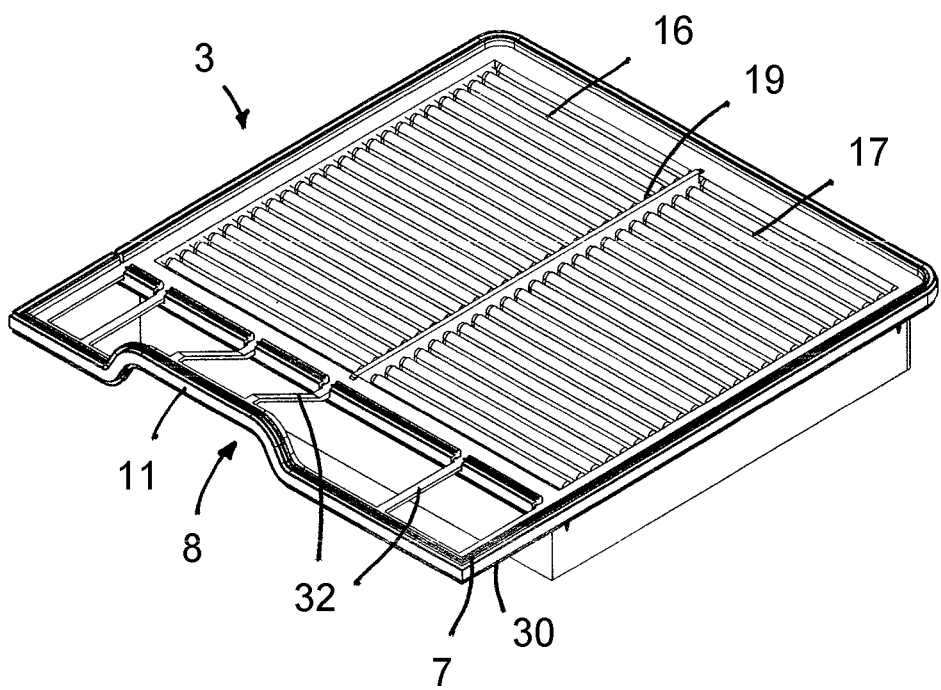
FIG. 16 shows a further filter element with two individual filters which are each formed as filter bellows with filter folds wherein a plastic frame injection molded onto the filter bellows projects at one side.

In FIG. 16, a further plate-type filter element 3 with two parallel arranged filter bellows 16 and 17 is illustrated which are each embodied as folded filters. The filter folds of the filter bellows 16, 17 that are connected by means of the sealing strip 19 extend parallel to each other and also parallel to the rim side of the filter element 3 where a clean-side gas collecting chamber 8 is located.

The gas collecting chamber 8 is laterally open; it is delimited only at one side by the rim area of the two filter bellows 16 and 17.

On the filter element 3 a circumferentially extending plastic frame 30 is arranged, in particular immediately applied by injection molding to the filter bellows 16 and 17. The plastic frame 30 follows the outer contour of the filter element 3 and is the support of the seal 7 that, relative to the top side of the filter bellows 16 and 17, is arranged in a raised position. In the area of the gas collecting chamber 8, the plastic frame 30 is laterally projecting past the filter bellows 16, 17 and is connected by connecting arms 32 to the section of the plastic frame that is positioned immediately on the outer contour of the filter element 3 with the filter bellows 16, 17. The connecting arms 32 are preferably part of the plastic frame 30 and can be produced in a common injection molding process together with the plastic frame.

A section of the projecting area of the plastic frame 30 at the gas collecting chamber 8 is embodied as a sealing bracket 11 that is three-dimensionally shaped as a bracket so that the sealing bracket 11 including the seal 7 projects past the plane of plastic frame 30 and seal 7 and comprises an additional spacing to the plane of the plate-type filter bellows 16, 17.

What is claimed is:

1. A plate-type filter element for gas filtration, the filter element comprising:
   a filter medium body formed by one or more adjoining connected filter bellows, each having filter medium folds;
   a seal circumferentially extending about a circumference of the filter medium body and configured to seal-tightly contact a first sealing surface provided on a filter housing and extending in a filter element plane of the filter element;
   wherein the seal, at two opposite lateral sides of the filter medium body, is arranged on the filter element plane, the filter element plane is parallel to an adjacent flow face of the filter medium body;
   a sealing bracket connected to the circumferentially extending seal and configured to seal-tightly contact a second sealing surface provided on the filter housing, wherein the sealing bracket curves outwardly away from the filter element plane, curving outwardly away from the filter body and filter element plane in a direction traverse to the filter element plane.

2. The filter element according to claim 1, wherein the sealing bracket comprises opposed ends that are connected to the circumferentially extending seal.

3. The filter element according to claim 1, wherein the sealing bracket is configured to seal-tightly contact the second sealing surface that has at least partially a curved extension.

4. The filter element according to claim 1, wherein the sealing bracket is shape-stable.

5. The filter element according to claim 1, wherein the sealing bracket is comprised of a plastic support;
   wherein the plastic support is connected directly onto the filter medium body;
   wherein a sealing material is applied onto the plastic support.

6. The filter element according to claim 5, wherein the seal comprises a plastic frame extending circumferentially on a circumference of the filter element and connected directly onto the filter medium body and the plastic support of the sealing bracket is connected to the frame of the seal,
   wherein a sealing material is disposed on the plastic frame.

7. The filter element according to claim 6, wherein the plastic frame is attached to the circumference of the filter element by injection molding.

8. The filter element according to claim 1, wherein the filter medium body delimits a gas collecting chamber which is open at a rim side of the filter medium body and is arranged at a clean side of the filter element;
   wherein the gas collecting chamber is a cutout in the filter medium body,
   wherein the gas collecting chamber comprises a basic shape that is selected from the group consisting of a round shape, an oval shape, a rectangular shape, and a triangular shape.

9. The filter element according to claim 1, wherein the one or more adjoining and connected filter bellows is at least two filter bellows;
   the filter folds of at least one of the filter bellows extend orthogonally to said rim side of the filter medium body where the gas collecting chamber is open, or
   the filter folds of at least one of the filter bellows extend parallel to said rim side of the filter medium body where the gas collecting chamber is open.

10. The filter element according to claim 1, wherein
the sealing bracket and a section of the circumferentially extending seal are configured to enclose together seal-tightly a fluid flow path extending laterally past the filter medium body.

11. The filter element according to claim 10, wherein
the filter medium body has a U-shaped configuration comprising
two lateral legs and
the fluid flow path is positioned between the two lateral legs of the U-shaped configuration.

12. A filter device comprising:
a filter housing comprising a first sealing surface and a second sealing surface;
a plate-type filter element according to claim 1 mounted exchangeably in the filter housing and defining a filter element plane;
wherein the first sealing surface extends in the filter element plane and the second sealing surface extends at least partially outside of the filter element plane;
wherein the seal is configured to seal-tightly contact the first sealing surface of the filter housing and
wherein the sealing bracket is configured to seal-tightly contact the second sealing surface of the filter housing.

13. The filter device according to claim 12, wherein
at least a section of the sealing bracket serves for sealing a housing interior of the filter housing relative to a housing exterior of the filter housing.

14. The filter device according to claim 12, wherein the second sealing surface is arranged on a wall surface of an outflow socket of the filter housing.

15. A plate-type filter element for gas filtration, the filter element comprising:
a filter medium body formed by one or more adjoining and connected filter bellows, each having filter medium folds;
a seal circumferentially extending about a circumference of the filter medium body and configured to seal-tightly contact a first sealing surface provided on a filter housing and extending in a filter element plane of the filter element;
wherein the seal, at two opposite lateral sides of the filter medium body, is arranged on the filter element plane, the filter element plane is parallel to an adjacent flow face of the filter medium body;
a sealing bracket connected to the circumferentially extending seal and configured to seal-tightly contact a second sealing surface provided on the filter housing and extending at least partially outside of the filter element plane of the filter element;
wherein the filter medium body has a first leg of filter medium and a second leg of filter medium which is spaced apart from the first leg of filter medium to form a U-shaped filter medium body;
wherein the filter medium body delimits a gas collecting chamber which is open at a rim side of the filter medium body and is arranged at a clean side of the filter element;
wherein the gas collecting chamber is formed as a cutout into the filter medium body, wherein the first leg of filter medium and the second leg of filter medium form opposite sidewalls of the gas collecting chamber.

16. The filter element according to claim 15, wherein
the sealing bracket is configured to seal-tightly contact the second sealing surface that extends at least partially in a plane parallel to the filter element plane.

17. The filter element according to claim 15, wherein
the sealing bracket is comprised of a deformable material and, in the undeformed state, is positioned at least approximately in the filter element plane.

18. The filter element according to claim 15, wherein
the sealing bracket is shape-stable
wherein the sealing bracket is comprised of a plastic support;
wherein the plastic support is connected directly onto the filter medium body
wherein a sealing material is applied onto the plastic support.

19. The filter element according to claim 18, wherein
the seal comprises a plastic frame extending circumferentially on a circumference of the filter element and connected directly onto the filter medium body and the plastic support of the sealing bracket is connected to the frame of the seal;
wherein a sealing material is disposed on the plastic frame.

20. The filter element according to claim 15, wherein
the one or more adjoining and connected filter bellows is at least two filter bellows;
the filter folds of at least one of the filter bellows extend orthogonally to said rim side of the filter medium body where the gas collecting chamber is open, or
the filter folds of at least one of the filter bellows extend parallel to said rim side of the filter medium body where the gas collecting chamber is open.

21. A filter device comprising:
a filter housing comprising a first sealing surface and a second sealing surface;
a plate-type filter element according to claim 15 mounted exchangeably in the filter housing and defining a filter element plane;
wherein the first sealing surface extends in the filter element plane and the second sealing surface extends at least partially outside of the filter element plane;
wherein the seal is configured to seal-tightly contact the first sealing surface of the filter housing and
wherein the sealing bracket is configured to seal-tightly contact the second sealing surface of the filter housing.

\* \* \* \* \*